United States Patent [19]

Volk

[11] Patent Number: 5,279,519
[45] Date of Patent: Jan. 18, 1994

[54] CHICKEN HOCK TRUSS

[75] Inventor: Daniel Volk, Turlock, Calif.

[73] Assignee: Volk Enterprises, Inc., Turlock, Calif.

[21] Appl. No.: 1,095

[22] Filed: Jan. 6, 1993

[51] Int. Cl.$^5$ ............................................. A22C 21/00
[52] U.S. Cl. ................................................... 452/174
[58] Field of Search ......................................... 452/174

[56] References Cited

U.S. PATENT DOCUMENTS

| | | | |
|---|---|---|---|
| 3,895,415 | 7/1975 | Volk | 452/174 |
| 4,051,573 | 10/1977 | Volk | 452/174 |
| 4,056,865 | 11/1977 | Cloyd | 452/174 |
| 4,293,977 | 10/1981 | Volk | 452/174 |
| 4,615,075 | 10/1986 | Volk | 452/174 |
| 4,653,146 | 3/1987 | Volk | 452/174 |
| 4,739,538 | 4/1988 | Volk | 452/174 |

*Primary Examiner*—Willis Little
*Attorney, Agent, or Firm*—Julian Caplan

[57] ABSTRACT

A flat, relatively rigid truss is disclosed which is useful for retaining hocks of dressed chicken hocks, which are more flexible than dressed turkey hocks, for example. A lower crosspiece has outward extending hooks which lock into the "kidney cavity" of the carcass. Outward upward slanted sides are connected by curves to a top traverse crosspiece. The upper and lower edges of the top crosspiece diverge at the center to form an opening for attachment of tags for weight, price, inspection data, cooking instructions and the like. The lower and upper crosspieces and sides define an enlarged opening to receive the hocks and tail of the chicken. The hocks fit into the insides of the curves at the intersections on the sides and top cross piece.

7 Claims, 1 Drawing Sheet

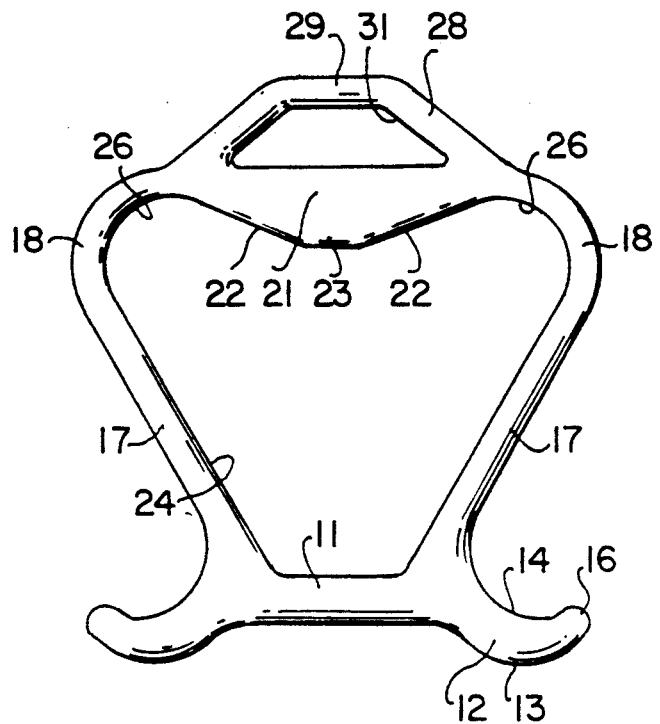
FIG. 1  FIG. 2
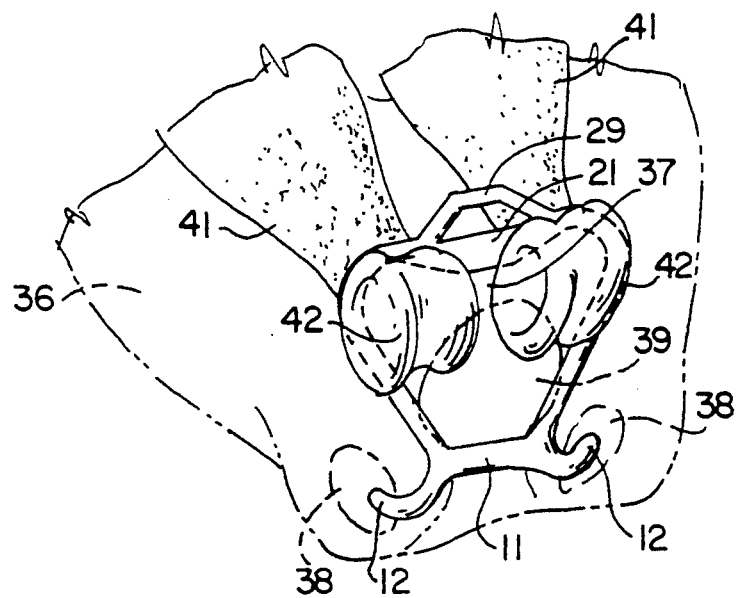
FIG. 3

CHICKEN HOCK TRUSS

BACKGROUND OF THE INVENTION

1. Field of the Invention

This invention relates to a new and improved chicken hock truss. More particularly the invention relates to a retainer or truss attached to the carcass of small poultry which is secured to the carcass and provides means to hold the knuckles of the thighs or hocks in close proximity to the sides of the carcass and also to provide means to tuck the tail inside the body cavity.

2. Description of Related Art

Various means have been used to hold the hocks or thighs of poultry against the sides of the carcass and also to tuck the tail into the body cavity. Such means is a convenient way to handle poultry during storage and transportation. Further it holds the poultry parts such as giblets within the body cavity. Finally, the use of such means improves roasting the fowl by keeping the hocks in close contact with the main carcass portion.

One means for retaining poultry hocks is by means of a wire bent in a particular shape to accomplish the above objectives. One such wire is shown in U.S. Pat. No. 4,293,977.

Plastic retainers have also been used. Such retainers have hooks which fit within the carcass and engage and extend outward to engage the kidney cavity or other location in the carcass to anchor the retainer in place. Typical of such retainers are U.S. Pat. Nos. 4,615,075 and 4,739,528. Such retainers have a central opening having curved surfaces against which the knuckles or the lower ends of the hocks bear. Heretofore such retainers have employed integral straps or strings to retain the hocks in engagement with the curved surfaces and also to secure the tailpiece tucked inside the body cavity. Such plastic retainers also have been provided with openings to which a tag may be attached. Automated machinery for trussing poultry also may take advantage of such openings to provide means for engaging the retainer.

Another means for trussing chickens and other small poultry employs an elastic string which is tied around the hocks and then threaded through the body cavity and secured to the neck stub.

The present invention is an improvement upon the aforesaid prior art and is particularly characterized by the fact that it is intended for small poultry—e.g., chickens. Chicken carcasses are considerably less rigid than turkey carcasses with which most of the aforesaid retainers have been used. Hence there are different requirements for small poultry retainers as contrasted with those for turkeys and other large fowl.

SUMMARY OF THE INVENTION

The present invention comprises an injection molded thin but yet relatively rigid plastic member which does not bow from a flat plane to any material extent when applied to poultry and further does not crack when the poultry is frozen nor deform when poultry is roasted.

The present invention comprises a bottom crosspiece from which extend hooks which may be inserted through the cavity rear opening into the body cavity with the hooks attaching to the "kidney openings" of the carcass or to other convenient location so that the retainer is anchored. Above the lower crosspiece is a truncated triangular opening defined by the central portion of the lower crosspiece, opposed sides which slant upwardly-outwardly and an upper transverse crosspiece. The corners at which the upper crosspiece and the upper ends of the sides intersect are rounded to fit the knuckles of the poultry received therein. A downward projecting portion of the upper transverse crosspiece extends into the upper portion of the triangular opening to assist in securing the hocks in place and also to provide means to retain the tail piece of the poultry tucked within the body cavity. Above the upper transverse crosspiece is an opening (preferably trapezoidal) defined by upward inward slanted members and a transverse connection there between.

The foregoing structure is characterized by the absence of straps or strings which have heretofore been located within the central opening and function to hold the knuckles in place as well as to hold the tail piece tucked into the body cavity. The absence of such straps simplifies structure and also simplifies the processing operation of applying the retainer to the poultry.

It has been found that chicken carcasses are generally not as rigid as turkeys. Accordingly, it is not necessary to use the straps or strings to force the hocks against the rounded surfaces of the truss against which they bear.

Further, since the central opening is devoid of strings or straps, installation is facilitated in that the knuckles may be inserted into the opening and then raised into the curved surfaces whereupon the tail may be tucked under the upper crosspiece.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a plan view of a retainer in accordance with the present invention.

FIG. 2 is a an end elevational view thereof.

FIG. 3 shows the retainer in position on poultry.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

The truss shown in the accompanying drawings has a lower transverse crosspiece 11 from opposite ends of which curve outwardly and downwardly arcuate hooks 12. Hooks 12 are defined by lower curved edge 13 and upper curved edge 14 with a rounded point 16 formed sharp enough to engage the kidney cavity of the fowl when the truss is installed.

Extending slanted outward upward from lower crosspiece 11 at approximately the base of the hooks 12 are sides 17 having inwardly curved upper ends 18.

Extending transversely between curved upper ends 18 is upper crosspiece 21 which has inwardly downwardly slanted lower edges 22 joined by transverse lower central portion 23. Accordingly, lower crosspiece 11, sides 17 and upper crosspiece 21 define a central opening 24. The upper corners 26 of opening 24 are rounded to receive the knuckles of the hocks of small poultry such as chickens.

An opening 31 is formed above upper transverse crosspiece 21, the opening 31 being generally trapezoidal and defined by the upper edge of the upper crosspiece 21, opposed inwardly upwardly slanted sides 28 and upper transverse central portion 29. The opening 31 has a number of functions. It is a convenient means for attachment of price tags, inspection data and cooking instructions. With the development of automatic trussing equipment, the opening 31 provides a convenient means for the equipment to grip the truss during installation and processing. Further the opening is a convenient means for gripping poultry after the truss has been anchored in the carcass.

Chicken carcass 36 after having been eviscerated is left with a rear opening 37. It will be understood that usable chicken parts, such as giblets, may be inserted into the cavity through the opening 38 and further that the consumer may insert stuffing through such cavity. The retainer of the present invention is attached to the carcass 36 by inserting the hooks 12 through the opening 37 so that the points 16 fit into the kidney opening 38 or other convenient means for attaching the retainer. Because the retainer is relatively rigid and remains approximately in a flat plane, it is conveniently used to hold the thighs 41 against the carcass 36. The opening 24 is sufficiently large so that the knuckles 42 may be inserted therethrough rapidly. As this operation is completed, the knuckles 42 fit into the curved corners 26, the depressed lower central portion 23 of the upper crosspiece 21 assisting in holding the knuckles in place. Further, it is customary to tuck the tail 39 of the poultry inside the opening 37, and for such purpose the lower central portion 23 engages the poultry tailpiece and holds it in place.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A truss for small poultry comprising a unitary, relatively rigid, thin plastic member comprising
    a lower transverse crosspiece, outward-downward extending hooks on either end of said lower transverse crosspiece,
    a pair of side members extending upward-outward each extending from said lower transverse crosspiece and terminating in an inwardly curved upper end,
    an upper transverse crosspiece joining said upper ends of said side members,
    said upper transverse crosspiece, said side members and said lower transverse crosspiece defining a truncated isosceles triangular central opening having a truncated vertex defined by said lower transverse crosspiece,
    the corners at the intersections of said upper transverse crosspiece and said inwardly curved upper ends of said sides being shaped to receive the knuckles of small poultry,
    said central opening being unobstructed.

2. A truss according to claim 1 in which said lower transverse crosspiece comprises a substantially straight edged rectangular cross-section member.

3. A truss according to claim 1 in which said sides diverge from said lower transverse crosspiece at an angle of about 60°.

4. A truss according to claim 1 in which each said side members are substantially straight edged and rectangular in cross-section.

5. A truss according to claim 1 in which said upper transverse crosspiece has a lower edge, said lower edge extending downward-inward from each of said corners.

6. A truss according to claim 5 which further comprises means defining a second opening over said upper transverse crosspiece defined by inward-upward second sides and a transverse central portion.

7. A truss according to claim 6 in which said second opening is substantially in the shape of a trapezoid.

* * * * *